(12) United States Patent
Riseman (10) Patent No.: US 7,395,239 B1
(45) Date of Patent: Jul. 1, 2008

(54) SYSTEM AND METHOD FOR AUTOMATICALLY PROCESSING LOAN APPLICATIONS

(75) Inventor: Milton Riseman, Radnor, PA (US)

(73) Assignee: American Business Financial, Bala Cynwyd, PA (US)

( * ) Notice: Subject to any disclaimer, the term of this patent is extended or adjusted under 35 U.S.C. 154(b) by 0 days.

(21) Appl. No.: 09/357,066

(22) Filed: Jul. 19, 1999

(51) Int. Cl.
*G06Q 40/00* (2006.01)
*G06F 17/60* (2006.01)

(52) U.S. Cl. .............................. 705/38; 705/39; 705/35

(58) Field of Classification Search .................. 705/35, 705/38–39
See application file for complete search history.

(56) References Cited

U.S. PATENT DOCUMENTS

| | | | |
|---|---|---|---|
| 4,648,044 A | | 3/1987 | Hardy et al. |
| 4,876,648 A | | 10/1989 | Lloyd |
| 5,239,462 A | | 8/1993 | Jones et al. |
| 5,262,941 A | * | 11/1993 | Saladin et al. ................ 705/38 |
| 5,361,201 A | * | 11/1994 | Jost et al. ....................... 705/35 |
| 5,408,587 A | | 4/1995 | Maier et al. |
| 5,481,647 A | * | 1/1996 | Brody et al. ................... 706/11 |
| 5,574,828 A | * | 11/1996 | Hayward et al. ............... 706/45 |
| 5,611,052 A | | 3/1997 | Dykstra et al. |
| 5,631,828 A | * | 5/1997 | Hagan ............................ 705/4 |
| 5,644,727 A | * | 7/1997 | Atkins .......................... 705/40 |
| 5,699,527 A | | 12/1997 | Davidson |
| 5,732,397 A | * | 3/1998 | DeTore et al. .................. 705/1 |
| 5,765,144 A | | 6/1998 | Larche et al. ................. 705/38 |
| 5,774,883 A | * | 6/1998 | Andersen et al. ............. 705/38 |
| 5,797,133 A | | 8/1998 | Jones et al. ................... 705/38 |
| 5,870,721 A | * | 2/1999 | Norris .......................... 705/38 |
| 5,930,776 A | | 7/1999 | Dykstra et al. ................ 705/38 |
| 5,940,811 A | | 8/1999 | Norris .......................... 705/38 |
| 5,940,812 A | | 8/1999 | Tengel et al. .................. 705/38 |
| 5,974,405 A | | 10/1999 | McGuinness et al. ......... 706/45 |
| 5,995,947 A | | 11/1999 | Fraser et al. ................... 705/38 |
| 5,995,956 A | | 11/1999 | Nguyen ........................ 706/38 |

(Continued)

FOREIGN PATENT DOCUMENTS

GB 2310944 A * 9/1997

(Continued)

OTHER PUBLICATIONS

Barrett, What bankers want to know before granting a small business loan, Jour. of Accountancy, v169n4 pp. 47-54, Apr. 1990 (Dialog(R) file 15 acc. No. 00494378).*

(Continued)

*Primary Examiner*—Cuong Nguyen
(74) *Attorney, Agent, or Firm*—Reed Smith LLP (57) ABSTRACT

A system and method for processing applications for loans secured by real estate, wherein an applicant is prompted for one or more parameters of a requested loan and for data regarding the applicant, data regarding the applicant's credit is accessed based on data provided by the applicant, predetermined rules are applied to the received data, it is automatically determined whether to approve the loan based on the results of the application of the predetermined rules to the received data, if the loan is approved, one or more terms of the loan are automatically determined based on the results of the application of the predetermined rules to the received data, and the applicant is informed whether the loan was approved and one or more terms of the loan, if approved.

2 Claims, 7 Drawing Sheets

U.S. PATENT DOCUMENTS

| | | | | |
|---|---|---|---|---|
| 6,012,047 | A | 1/2000 | Mazonas et al. | 705/38 |
| 6,029,149 | A | 2/2000 | Dykstra et al. | 705/38 |
| 6,055,513 | A | 4/2000 | Katz et al. | 705/26 |
| 6,385,594 | B1 * | 5/2002 | Lebda et al. | 705/38 |
| 2002/0116327 | A1 * | 8/2002 | Srinivasan | 705/38 |

FOREIGN PATENT DOCUMENTS

| | | | |
|---|---|---|---|
| JP | 09237305 A | * | 9/1997 |
| JP | 2001118004 A | * | 4/2001 |
| JP | 2001306805 A | * | 11/2001 |
| JP | 2002056212 A | * | 2/2002 |
| JP | 2002099724 A | * | 4/2002 |
| WO | WO 99/59084 | | 11/1999 |
| WO | WO 9959084 A1 | * | 11/1999 |

OTHER PUBLICATIONS

Hopson et al., Expand your practive with loan proposals, WG&L Accounting New v9n3 pp. 1, 26-28, Fall 1988 (from Dialog(R) file 15 acc. No. 00424769).*

Graham, Plans hinge on hard-to-get loan, Commerial Appeal, Final Section p. A1, Jan. 17, 1991 (from Dialog(R) file 740 acc. No. 06017177).*

From http://web.archive.org/web/ . . . , Internet archive wayback machine for http://www.lendingtree.com wherein it shows lendingtree.com existed since 1999, printed on Jun. 28, 2002.*

Lore Croghan, Dime automates consumer lending, Crain's New York Business, May 5, 1997 (From Dialog(R) File 16, acc. No. 05011370).*

Purwandaya, a disertation titled Lender response to credit risk: The case of Bank Perkreditan Rakyat in East Java, Indonesia University of Illinois at Urbana-Champain, 1999 (from Dialog(R) File 35, acc. No. 01711169).*

From Dialog(R) File 9, acc. No. 2062086), Affinity picks up some new passengers as is steers a new lending course, Report on Home Banking & Finance Services, v.3 n7, p. 7+, Jan. 16, 1998.*

David Lereah, Decent prospects ahead, Mortgage Banking, v57n4, Jan. 1997 (From Dialog(R) File 15, acc. No. 01363135).*

Phil Britt, Automated load machines, America's Community Banker, v5n3, Mar. 1996 (from Dialog(R) File 15, acc. No. 01155465).*

Srinivasan, PGPUB-Document-No. 20020116327—Aug. 22, 2002, System and methods for syndiction of financial obligations. Barrett, What bankers want to know before granting a small business loan, Jour. of Accountancy, v169n4 pp. 47-54, Apr. 1990, (Dialog(R) file 15 acc. No. 00494378).*

Graham, Plans hinge on hard-to-get loan, Commerical Appeal, Final Section p. A1, Jan. 17, 1991 (from Dialog(R) file 740 acc. No. 06017177).*

From http://www.archive.org/web/ . . . , Internet archive wayback machine for http://www.lendingtree.com wherein it shows lendingtree.com existed since 1999, printed on Jun. 28, 2002.*

* cited by examiner

| Loan Type | Second Mortgage Loan ⇕ | 302 | To apply for a loan, complete the data requested on this and the following screen. Your credit report and an appraisal of your real estate will be retrieved automatically and your loan application can be approved or denied in a matter of minutes while you wait online. |
| First Mortgage Loan | | | |
| Second Mortgage Loan | | | |
| Unsecured Loan | | | |

Loan Amount: $50,000  304

Net Value of Security: $60,000  306

Type of Security: Real Estate  308

300

310  312  314
[Next >]  [Reset]  [Cancel]

SYSTEM AND METHOD FOR AUTOMATICALLY PROCESSING LOAN APPLICATIONS

FIELD OF THE INVENTION

The present invention relates generally to processing loan applications automatically and more particularly to processing applications for secured loans automatically.

BACKGROUND

The application process for secured loans has traditionally been a protracted and inefficient process. The applicant would meet with a salesman who would provisionally offer a loan to the applicant, without knowing whether the loan would meet the lender's underwriting standards. If the applicant decided to accept the loan, the salesman would then request that the applicant complete an application and submit certain documents, such as an appraisal of any collateral to be offered as security. The salesman would then route all of the paperwork to the lender's processing department, where additional documents, such as credit reports, might be requested. Eventually, the documents would be forwarded to an underwriter, who would then determine whether the requested loan met the lender's underwriting standards and if any further documentation was necessary. If the loan did not meet the lender's underwriting standards, the underwriter and the salesman might negotiate the changes to the terms of the loan that would be necessary to meet these standards. After the underwriter and the salesman agreed on terms, it would be necessary for the salesman and the applicant to negotiate with respect to the terms agreed on by the underwriter and the salesman. Any changes agreed to by the applicant and the salesman might require further negotiations between the salesman and the underwriter, et cetera.

This process was inefficient from both the applicant's point of view and the lender's point of view. For the applicant, the protracted nature of the process both delayed the applicant's receipt of the loan proceeds and complicated efforts to compare the terms offered by multiple lenders. For the lender, the involvement of multiple employees with a single loan application dramatically increased the number of man hours necessary to complete a loan, thereby decreasing the lender's profit margins. Moreover, the lack of knowledge of the salesman of the lender's underwriting standards tended to result in the salesman's offer of terms unacceptable to the lender, resulting in further delays.

It is therefore an object of the present invention to provide a system and method for automating the process of processing a loan application so as to decrease the costs incurred by a lender in processing a loan application.

It is a further object of the present invention to provide a system and method for automatically determining whether proposed loan terms meet a lender's underwriting standards.

SUMMARY OF THE INVENTION

A system and method for processing applications for loans secured by real estate is provided, wherein an applicant is prompted for one or more parameters of a requested loan and for data regarding the applicant, data regarding the applicant's credit is accessed based on data provided by the applicant, predetermined rules are applied to the received data, it is automatically determined whether to approve the loan based on the results of the application of the predetermined rules to the received data, if the loan is approved, one or more terms of the loan are automatically determined based on the results of the application of the predetermined rules to the received data, and the applicant is informed whether the loan was approved and one or more terms of the loan, if approved.

DETAILED DESCRIPTION OF THE INVENTION

The following definitions are provided to aid in construing the claims of the present application:

Affiliated entity. Within the meaning of the present application, an entity is a natural person, a business entity, such as a corporation or a partnership, or other entity, such as an estate or trust. An affiliated entity is any other entity related to the first entity, such as the spouse of a natural person or a subsidiary of a business entity.

Expected net economic benefit. The expected profit of the lender on a loan, expressed as a percentage, rather than a sum of money. The expected net economic benefit takes into account the present value of all payments of income and principal that would be due on the loan, the lender's expected costs with respect to the loan, the cost of the lender's interest rate risk, and the lender's expected losses due to loan defaults and other events. Thus, loans with different interest rates may yield the same expected net economic benefit to the lender, depending on other factors.

Knowledge base. A database of knowledge about a subject that is expressed in a formal knowledge representation language and is used in an expert system.

Taxpayer identification number. The social security number of a natural person or the taxpayer identification number of any other entity.

User session. In general, a user session is the time during which two or more computers maintain a connection. With respect to the present invention, a user session is the time during which an applicant is continuously in direct or indirect communication with a computerized system. With reference to the specific embodiments implemented in a World Wide Web [hereinafter the "Web"] environment and set forth in detail below, a user session is the time, after the connection of the user's computer, which may be a workstation or a terminal, to a Web server by an Internet connection and the launching of the user's Web browser, commencing when the user accesses any Web page within the Web site discussed in further detail herein, continuing while the user is accessing any page on the Web site, and terminating when the user ceases to access any page on the Web site. For purposes of this definition, accessing a Web page includes not only the time during which data is being requested or downloaded from the appropriate Web server, but also the time during which (i) the relevant Web page is being displayed in a Web browser and (ii) the user's computer is connected to the Internet. With respect to the embodiments in which the applicant indirectly accesses the system by placing a telephone call to an employee of the lender, who in turn accesses the system over the Web or through an intranet or other network, a user session is defined as the period of time during which (i) the above conditions with respect to Web users are met, treating the lender's employee as the user, and (ii) the applicant is in continuous telephonic communication with such employee.

Figure 1:
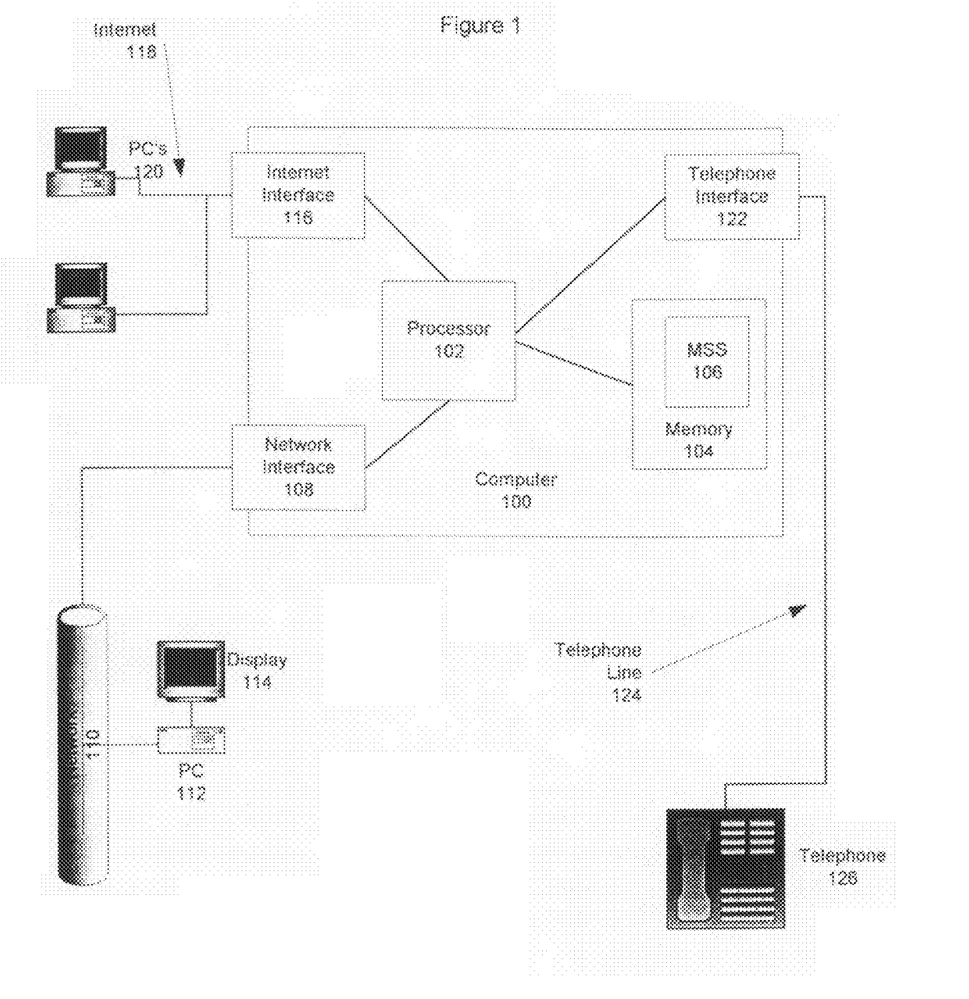
FIG. 1 is a block diagram illustrating a preferred embodiment of the present invention.

Referring to FIG. 1, a system in accordance with a preferred embodiment of the present invention is set forth. A computer 100, which may be a mainframe computer, a minicomputer, or a microcomputer, comprises at least one processor 102, which may be a microprocessor, and a memory 104, which may be temporary memory, such as random access memory, permanent storage, such as a hard drive, or a combination of temporary memory and permanent storage. In a preferred embodiment, computer 100 is a four processor Pentium family workstation running Windows NT and comprising both random access memory and at least one hard drive. Mortgage system software [hereinafter "MSS"] 106 is stored in memory 104. Alternatively, MSS may be stored on a removable computer readable medium, such as a CD-ROM.

MSS is preferably a client server software application. In a first preferred embodiment, MSS is an application designed to be accessed primarily by users utilizing Web browsers, such as Microsoft Internet Explorer through an Internet or network connection. In the first preferred embodiment, MSS is a collection of Web pages and databases accessed by code stored with the Web pages. MSS may be written in Java utilizing object oriented techniques. In some embodiments, the databases may include knowledge bases incorporating underwriting and other standards and rules.

Processor 102 is connected to one or more interfaces, which may each comprise hardware, software, or a combination of hardware and software. In a first preferred embodiment, three interfaces are provided: network interface 108, Internet interface 116, and telephone interface 122. Network and Internet interfaces 108 and 116 may comprise hardware such as computer ports, modems, and network cards. Telephone interface 122 may include a voice recognition device and other hardware.

Network interface 108 is connected to network 110, which may be an Ethernet based local area network, which in turn is connected to computer 112, which may be a workstation, such as a Pentium family personal computer running a version of the Windows operating system. Computer 112 is connected to display 114, which may be a cathode ray tube display. A front end for accessing MSS is stored in computer 112. In a first preferred embodiment, the front end is a Web browser, such as Microsoft Internet Explorer, but in other embodiments custom built front ends may be used. The advantages of using a Web browser include the low cost of purchase of a Web browser and the general familiarity of users with Web browsers. The advantages of custom built front ends include the ability to build enhanced security features and robustness into the front end.

Internet interface 116 is connected to the Internet 118, which in turn is connected to a plurality of computers, such as Pentium family personal computers running versions of the Windows operating system. If a Web browser is used as a front end for accessing MSS on internal network 110, a Web browser may also be used for accessing MSS over the Internet. Nevertheless, the functionality exposed to persons accessing MSS over the Internet may be different from the functionality exposed to persons accessing MSS over the internal company network. For example, internal users might be able to access an additional Web page (which might be stored on a company intranet server) from which they might be able to edit data entered by other persons (such as customers). If a Web browser is not used as the front end, it may be necessary to provide a variety of front end applications (one per operating system used by prospective customers) for download from a Web page.

Telephone interface 122 is connected to telephone line 124 which is connected through the telephone network to a plurality of telephones 126. Telephone interface 122 may support voice recognition or may only support detection of keys pressed on a touch tone telephone. In either case, telephone interface 122 provides prerecorded messages prompting the user to enter each item of information requested in the Web pages described below and provides the user with the option to select any option available in the Web pages. (E.g., "Select one to apply for the loan using the information already entered, select two to edit your applicant information, select three to edit your loan parameters, or select four to cancel.")

In the preferred embodiments, the applicant may select from a plurality of methods for interacting with MSS: accessing MSS over an Internet connection, accessing MSS from a telephone connection, or accessing MSS indirectly by calling a customer representative who in turn accesses MSS over an internal company network. The existence of multiple methods of interaction allows a prospective applicant to select the method most comfortable or convenient to him. However, in other embodiments of the present invention, a greater or lesser number of the same or other methods of interaction may be provided. In some embodiments, only one method may be provided. In particular, it is envisioned that a company would initially allow only one method of interaction, but afterwards add others.

Referring to FIGS. 2A, 2B, and 3A through 3D, after the applicant has accessed the lender's Web site and decided to apply for a loan, or after the applicant has placed a telephone call to a loan officer of the lender or to the automatic voice response number, the applicant is prompted by MSS to provide loan parameters. For purposes of simplicity, only a Web embodiment will be further described herein, but those skilled in the art will appreciate that the instant method may be similarly implemented in other embodiments. It will further be appreciated that a lender might provide applicants with far more information regarding the loan process, and seek from the applicants far more information regarding them and their desired loans than is illustrated in FIGS. 3A through 3D. For purposes of brevity and clarity, FIGS. 3A through 3D describe only a minimal version of the Web embodiment.

Figure 3A:
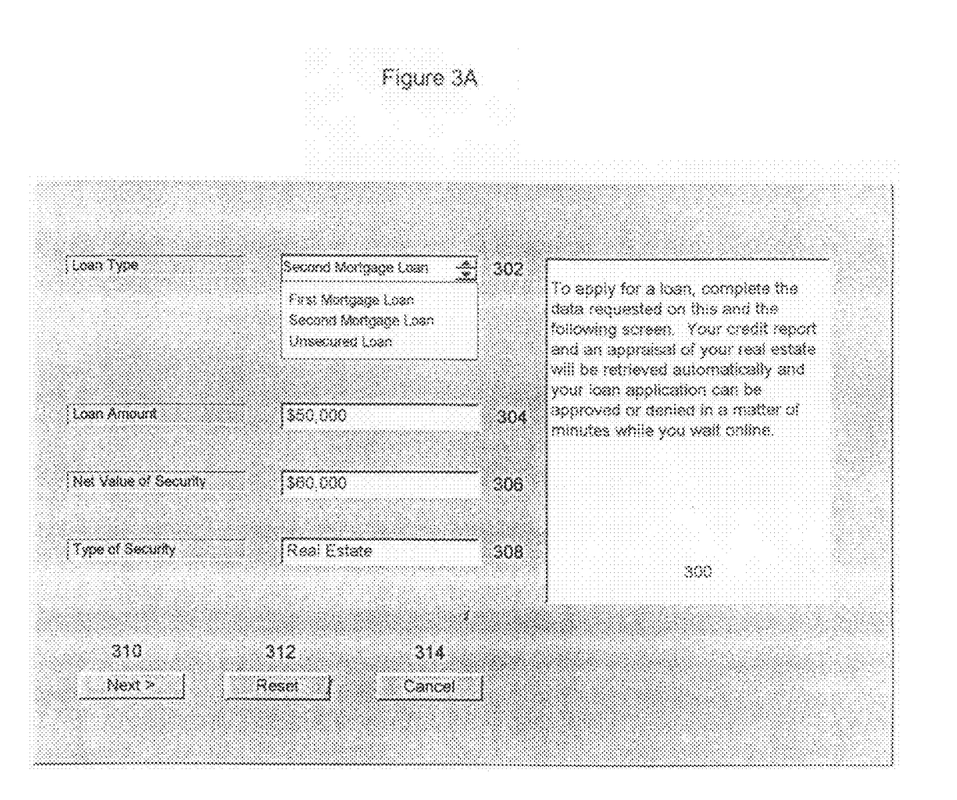
FIG. 3A illustrates a first screen of a user interface in accordance with a preferred embodiment of the present invention.

Referring to FIG. 3A, the applicant is provided with a brief explanation of the loan application process 300 and a plurality of labeled edit boxes and list boxes 302 through 308 in which to enter data. The particular loan parameters will vary from embodiment to embodiment, but may include loan amount, collateral type and value, loan term, interest rate, and points. The use of list boxes simplifies further processing by restricting applicants to entering predetermined choices, provisions for handling such choices having been hard coded into the executable code or entered into a resource, such as a database available to MSS. Edit boxes designed for numeric input may be parsed by conventional methods (returning an error if an improper character such as a letter is present, stripping off such characters as dollar signs and commas, and converting the remaining string of numerals to a number), but edit boxes designed for descriptive input may require other parsing methods (such as natural language processing and information extraction). A plurality of buttons for proceeding to the next screen 310, clearing the input on the present screen 312, and canceling the loan application process 314 is also provided.

Figure 3B:
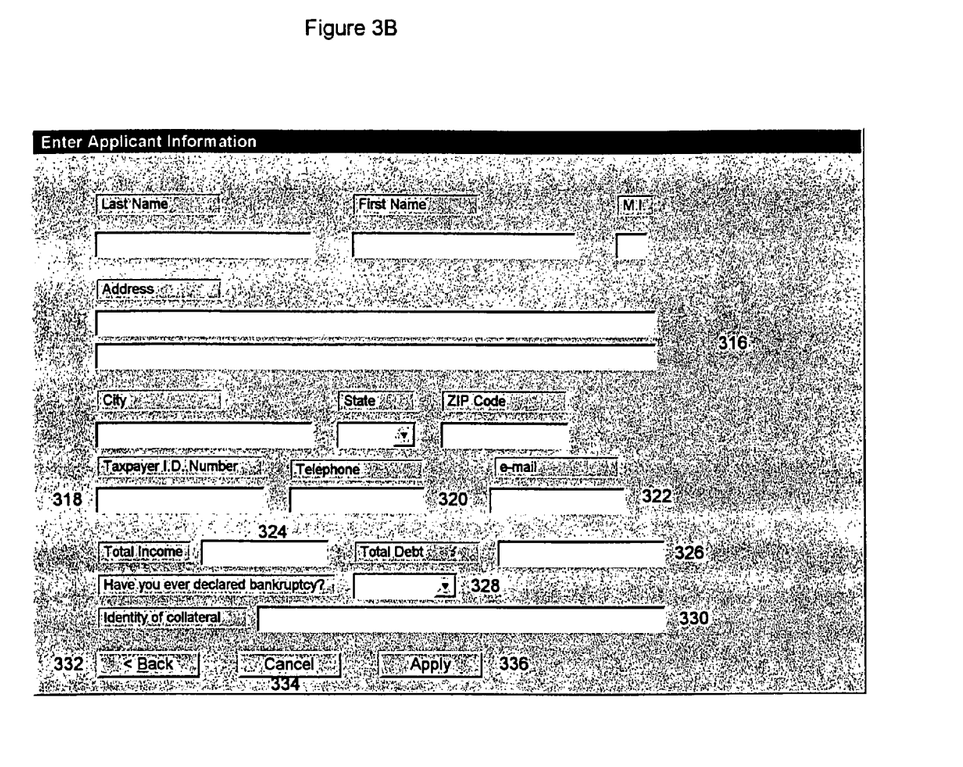
FIG. 3B illustrates a second screen of a user interface in accordance with a preferred embodiment of the present invention.

When the applicant presses button 314, the applicant is prompted to enter information regarding the applicant in step 202 by the display of the screen illustrated in FIG. 3B. The applicant is prompted to enter his name and address in list and edit boxes 316, his taxpayer identification number in edit box 318, a telephone number in edit box 320, an e-mail address in edit box 322, his total income in edit box 324, his total debt in edit box 326, whether he has ever declared bankruptcy in list box 328, and the identity of collateral in edit box 330. Buttons for returning to edit the loan parameters 332, canceling the loan process 334, and applying for a loan based on the entered data 336 are also provided.

When the applicant pushes button 336, entered data may be validated. For example, edit boxes 304, 306, 324, and 326 may be checked to ensure that the entered data is numeric in character and reasonable in amount. The contents of edit box 322 may be similarly checked to ensure that they form a possibly legal e-mail address. At this point, the entered data may be stored permanently in a database by the lender, or storage may be deferred until after loan approval. Derived data may also be computed at this or a later date. For example, debt to income, loan to net collateral value, and estimated loan payment to income ratios may be computed. Moreover, steps 200 and 202 may be merged together or separated into a greater number of steps in certain embodiments of the present invention.

Figure 2A:
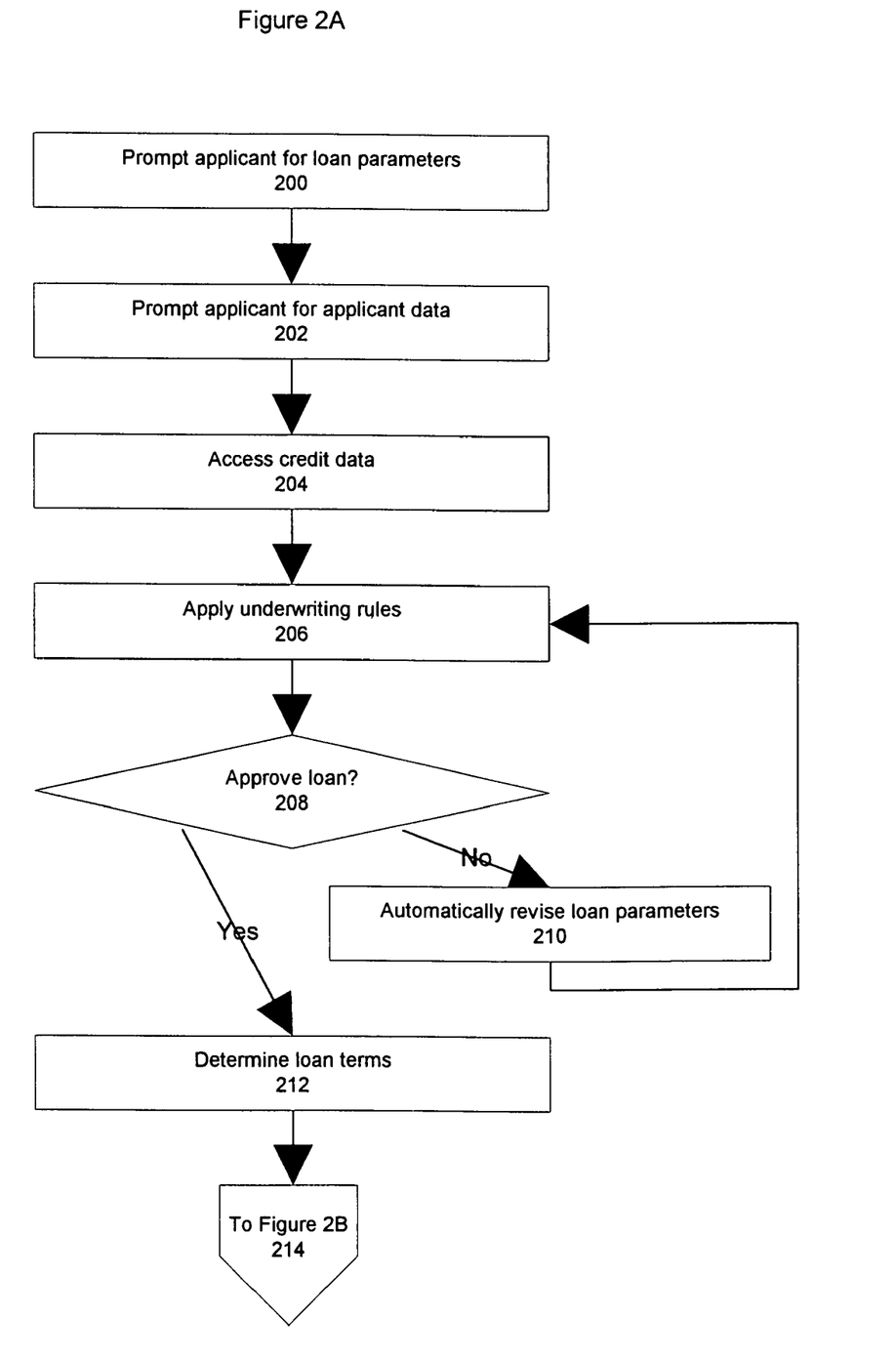
FIG. 2 is a flow chart illustrating the operation of a method in accordance with a preferred embodiment of the present invention.

In step 204, MSS automatically accesses and reviews data regarding the applicant's credit history. Such data may include data stored in internal databases regarding prior loans or other interactions with the applicant, credit reports obtained electronically from major credit reporting agencies, and appraisals of offered collateral obtained electronically. To comply with applicable law, it may be necessary to obtain the applicant's explicit consent to credit gathering activities before carrying out step 204.

In step 206, predetermined underwriting rules are applied by MSS to the data gathered in steps 200 through 204. Such rules may be hard coded into MSS, stored in a commercial off-the-shelf relational (or other) database, such as Oracle, or stored in a knowledge base. Such rules may include rules prohibiting loans in certain circumstances, as exemplified in Table 1, such as prior bankruptcy of the applicant, or combinations of circumstances, such as prior bankruptcy of the applicant combined with an unfavorable loan amount to net collateral value ratio. Other rules may prescribed terms of the loan. For example, a more favorable loan amount to net collateral value ratio may permit a lower interest rate to be offered. Table 2 illustrates a few of the rules that might be stored in a relational database in an implementation of the present invention utilizing a database to store the underwriting rules. Table 2 stores the interest rates that are to be offered depending on the type of mortgage (first or second) and loan amount to net collateral value. Note that for reasons of simplicity, Table 2 is illustrated as a single table, but that in a production database the table might be normalized into two or more tables. Also, other tables might be necessary to store other types of rules.

In step 208, MSS determines whether to approve the loan application based on the application of the underwriting rules in step 206. Of course, steps 206 and 208 may be merged together in certain embodiments of the present invention, and not all underwriting rules need be applied if the application of one or more rules requires the denial of the loan application. Nevertheless, in a preferred embodiment, the decision of whether to approve the loan is not made until the results of the application of all relevant underwriting rules are available. In step 208, MSS may utilize stored underwriting criteria to determine whether to approve a loan.

If the application is denied, MSS may automatically revise loan parameters in certain circumstances in step 210. In particular, if the application is denied due to the value of a loan parameter, MSS will automatically revise one or more loan parameters in an attempt to approve a loan for the applicant. For example, the loan amount might be decreased or the loan type might be changed from second mortgage to first mortgage. (The applicant would satisfy the debt to the existing first mortgage holder with a portion of the loan proceeds.)) This type of exemplary repair strategy is illustrated in Tables 3, 4, and 5. MSS would then return to step 206 and reapply the underwriting rules to the revised application. In other circumstances, MSS will not attempt to revise loan parameters in step 210. For example, if an application is denied due to the applicant's poor credit history, the method will terminate in step 210 with the applicant being informed of the denial of the application.

If a loan is approved in step 208, the terms of the loan will be determined in step 212. Some of these terms will have been set by the applicant in step 200 (and perhaps modified by MSS in step 210). Other terms will be standard boiler plate terms that would not ordinarily be negotiable. Other terms that must be set at this point may include loan parameters not set by the applicant. In the preferred embodiments, MSS will set remaining loan parameters so as to ensure that the net economic benefit of the loan to the lender is equal to a predetermined value. In certain embodiments of the present invention, MSS will determine several alternative sets of approved loan terms (with only one set being initially disclosed to the applicant in some embodiments and the others being presented in turn upon rejection of previous sets of loan terms). These alternative sets of approved loan terms may be the only sets of loan terms that will be accepted by the lender in some embodiments.

Figure 2B:
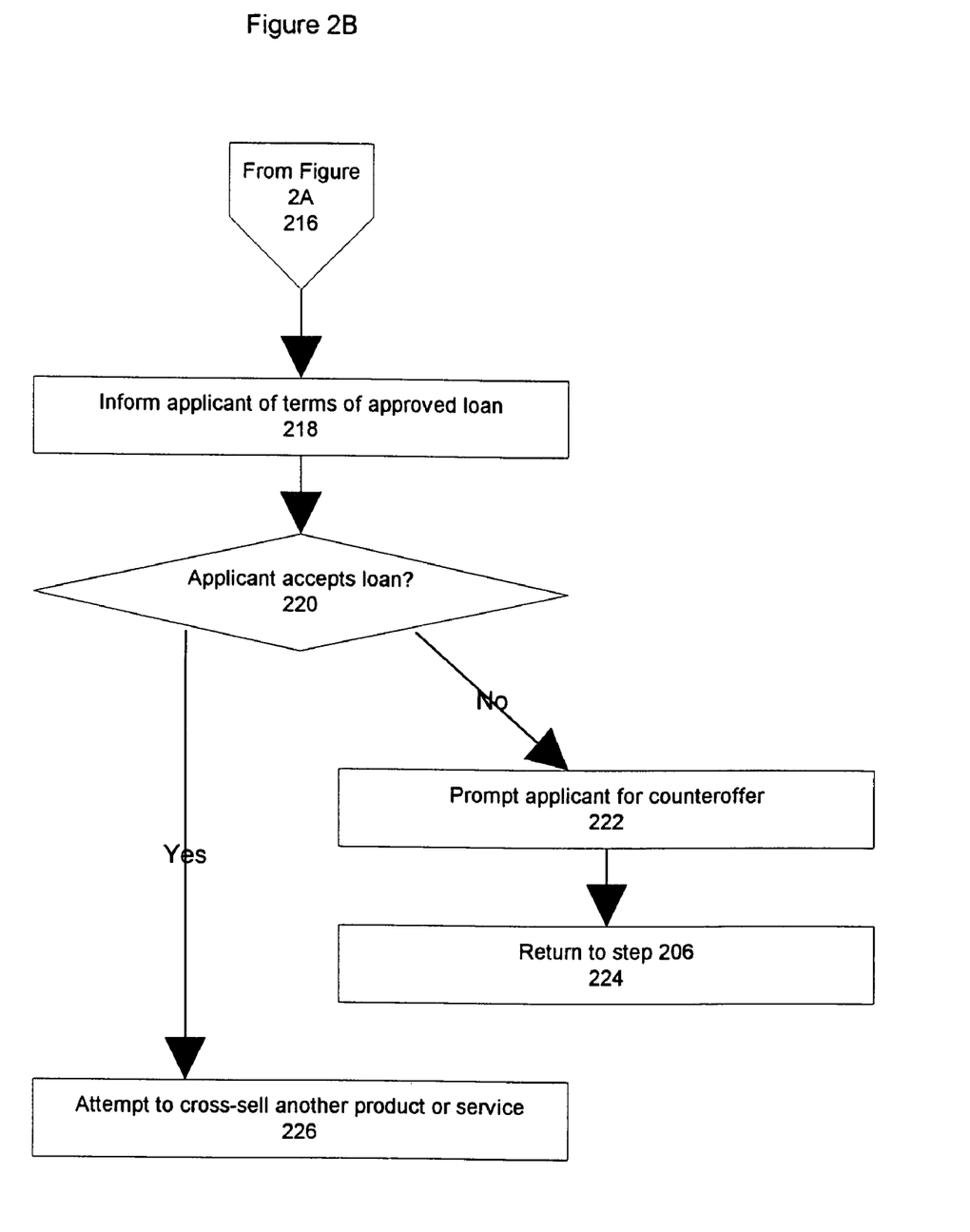

Step 214 of FIG. 2A leads to step 216 of FIG. 2B. In step 218, the applicant is informed of the terms of the approved loan by the display of the screen illustrated in FIG. 3C. The most significant terms are displayed in text area 338, as well as instructions for proceeding with the loan process. Button 340 permits the applicant to see the full loan agreement, including all boilerplate provisions. Button 342 permits the applicant to accept the terms of the offered loan and continue with the loan process (which would include an eventual face-to-face loan closing). Button 344 permits the applicant to submit a counteroffer by accessing the screen illustrated in FIG. 3D. Finally, button 346 permits the applicant to cancel the entire loan application process.

Figure 3C:
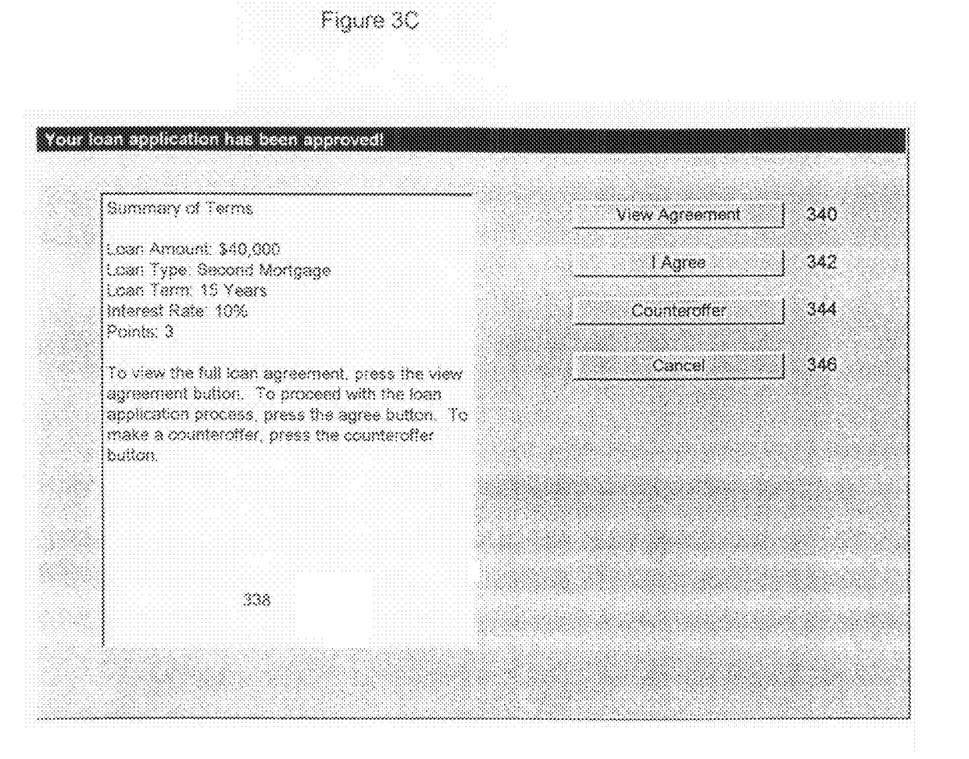
FIG. 3C illustrates a third screen of a user interface in accordance with a preferred embodiment of the present invention.
Figure 3D:
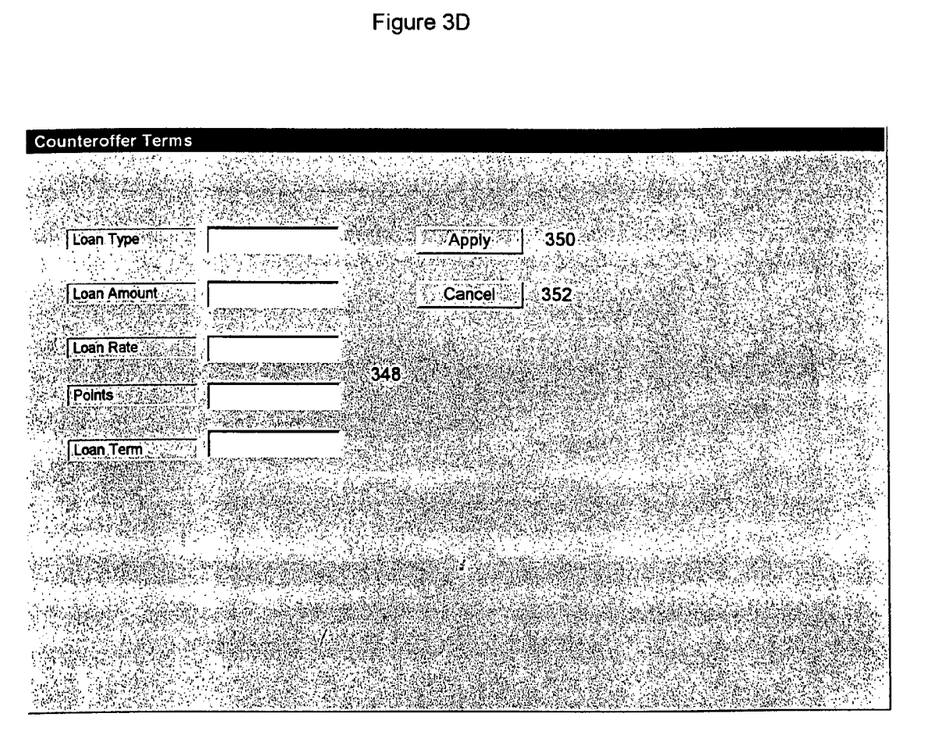
FIG. 3D illustrates a fourth screen of a user interface in accordance with a preferred embodiment of the present invention.

In step 220, the applicant accepts or declines the loan by selecting one of buttons 342, 344, or 346. If the applicant selects button 344 (or optionally button 346 as well), the applicant is prompted to submit a counteroffer by the display of the screen illustrated in FIG. 3D. Edit boxes 348 corresponding to loan parameters, such as the amount of the loan and the interest rate, are displayed with the values embodied in the currently approved set of terms shown. If the user modifies the contents of text boxes 348 and selects button 350, MSS returns to step 206 in step 224 and applies the underwriting rules to the modified loan parameters. In a first preferred embodiment, MSS will not permit the applicant to decrease the expected net economic benefit to it of the loan by modifying the loan parameters. Thus, the applicant's alteration of one or more loan parameters to favor him will require the alteration of other loan parameters to restore the balance. However, MSS will, in a first preferred embodiment, only alter those loan parameters not modified by the applicant to the extent possible. In other embodiments, however, MSS may allow the applicant to improve the terms of the loan from the applicant's viewpoint, so long as the net economic benefit of the loan to the lender is not decreased below a predetermined minimum value.

If the applicant accepts the loan in step 220, MSS will attempt to cross-sell another product or service to the applicant in step 226. MSS does so either by applying the underwriting rules to determine whether the applicant qualifies for each product and service offered by the lender and then offering any products and services for which the applicant qualifies to the applicant, or by consulting a table or list specifying appropriate products and services to be cross-sold. For example, a table might specify that applicants approved for loans should be offered loan insurance (if they meet the applicable underwriting standards). In certain embodiments, applicants may be cross-sold even if they refuse to accept offered loans or their applications are denied.

Thus, the lender is able to process an applicant's loan application from initial application to final credit approval automatically in the course of a single user session (in the case of the Web embodiment) or a single telephone call. In a first preferred embodiment, the remaining steps of the loan process are accomplished using traditional methods. However, in other embodiments, all steps may be accomplished electronically. The applicant may conduct any remaining negotiations by e-mail or using teleconferencing technology, may accept electronically a loan agreement in digital form (by using a digital signature or otherwise), may receive the loan proceeds by electronic funds transfer, and may arrange for loan payments to be made automatically by electronic funds transfer.

With respect to the method described in FIGS. 2A and 2B, in certain preferred embodiments, some or all of the steps of the method will be permitted to occur no more than a predetermined number of times and each applicant may be permitted to utilize the Web site no more than a predetermined number of times. Limiting the number of repetitions of the method frees up system resources by limiting the ability of applicants to endlessly tinker with loan terms, prevents applicants from becoming lost in an endless loop, decreases the ability of competitors to determine the lender's precise underwriting standards, and provides some protection against hackers seeking to overload the system. (Of course, standard firewalls and other measures would also be used.) The number of repetitions of the method and each step thereof may be stored using cookies or other technology. In a first preferred embodiment, the predetermined number may be different for different steps and not all steps will be so restricted.

The present invention may be embodied in other specific forms without departing from the spirit or essential attributes of the invention. Accordingly, reference should be made to the appended claims, rather than the foregoing specification, as indicating the scope of the invention.

TABLE 1

Exemplary List of Exclusionary Rules

| Item | Description |
|---|---|
| Property Exclusionary | IF Property Address is in one of a set of Excluded States, THEN bypass mortgage loan option generation. |

TABLE 1-continued

Exemplary List of Exclusionary Rules

| Item | Description |
|---|---|
| Rules | IF Property Type is one of a set of Excluded Property Types, THEN bypass mortgage loan option generation. IF Property Type is 'High-rise condo (>8 stories)' AND Property Address is not Boulder, CO OR New York, NY, THEN flag for review by underwriter. |
| Borrower Exclusionary Rules | IF Entity Type is a one of a set of Excluded Entity Types, THEN bypass mortgage loan option generation and route to appropriate department. IF Borrower Citizenship is neither a 'US citizen' nor a 'resident alien', THEN bypass mortgage loan option generation. IF Borrower Home Ownership is 'doesn't own a home and is not going to buy a home with this loan' THEN bypass mortgage loan option generation. IF Borrower has a current bankruptcy, THEN proceed to mortgage loan option generation, but flag for review and do not return a generated mortgage loan option to borrower. IF the Borrower's credit cannot be graded because of FICO score or mortgage history, THEN bypass mortgage loan option generation and flag for review. |

TABLE 2

| Name | Loan Type | Min. Col. | Max. Col. | Int. Rate |
|---|---|---|---|---|
| First pref. | First mortgage | 0% | 89% | 8% |
| First reg. | First mortgage | 90% | 100% | 9% |
| First prohibited | First mortgage | 101% | — | — |
| Second pref. | Second mortgage | 0% | 89% | 10% |
| Second reg. | Second mortgage | 90% | 100% | 11% |
| Second prohibited | Second mortgage | 101% | — | — |

TABLE 3

Repair Strategy for Loan Amount

| | Repair Strategy | |
|---|---|---|
| Mortgage Loan Purpose | Mortgage Loan Amount Too Low | Mortgage Loan Amount Too High |
| Cash Out | 1. Increase cash out | 1. Decrease debts to pay off |
| Debt Consolidation | 1. Increase debts to pay off | 1. Decrease cash out |
| Both | | 1. Equally decrease debts to payoff and cash out. |

TABLE 4

Repair Strategy for Loan-To-Value Ratio

| Mortgage Loan Purpose | Repair Strategy |
|---|---|
| Cash Out | Decrease debts to pay off Decrease points and increase rate Decrease cash out |
| Debt Consolidation | Decrease cash out Decrease debts to pay off |
| Both | Equally decrease debts to pay off and cash out |

TABLE 5

| Mortgage Loan Purpose | Repair Strategy for Debt-To-Income Ratio |
|---|---|
| | Repair Strategy |
| Cash Out | Extend term |
| | Increase mortgage loan amount to pay off more debt |
| | Reduce cash out to pay off more debt |
| | Reduce cash out |
| | Add points |
| Debt Consolidation | Extend term |
| | Increase mortgage loan amount to pay off more debt |
| | Reduce cash out to pay off more debt |
| | Reduce cash out |
| | Add paints |
| Both | Extend term |
| | Increase mortgage loan amount to pay off more debt |
| | Reduce cash out to pay off more debt |
| | Reduce cash out |
| | Add points |

What is claimed is:

1. A method for processing applications for loans secured by real estate, comprising the steps of:
   (a) prompting an applicant for one or more parameters of a requested loan, including loan amount information;
   (b) prompting the applicant for data regarding the applicant, including information regarding real estate owned by the applicant to be used to secure the requested loan;
   (c) automatically interfacing with at least one credit reporting service for real-time access and review of the applicant's entire credit based on data provided by the applicant;
   (d) applying a plurality of predetermined rules to the data received in steps (a) through (c);
   (e) automatically applying loan criteria to the requested loan based on the parameters supplied by the applicant in step (a) and the results of step (d);
   (f) automatically applying a plurality of strategies to the results of step (e) and generating a plurality of proposed loans based on the results of steps (d) and (e), wherein each of the proposed loans includes a unique set of loan terms; and
   (g) presenting the applicant with the plurality of proposed loans, wherein steps (a) through (g) are performed during a single user session.

2. A method for processing applications for loans secured by real estate, comprising the steps of:
   (a) prompting an applicant for one or more parameters of a requested loan;
   (b) prompting the applicant for data regarding the applicant;
   (c) automatically accessing and reviewing data regarding the applicant's entire credit based on data provided by the applicant in step (b);
   (d) applying predetermined rules to the data received in steps (a) through (c);
   (e) automatically determining whether to approve the loan based on the results of step (d);
   (f) if the loan is approved in step (e), automatically determining one or more terms of the loan based on the results of step (d);
   (g) if the loan is not approved in step (e), automatically applying predetermined strategies to determine whether to adjust the loan parameters;
   (h) if the loan is not approved in step (e) and it is determined in step (g) to adjust the loan parameters, automatically adjusting one or more loan parameters;
   (i) repeating steps (d) through (b) for no more than a predetermined number of iterations until the loan is approved in step (e); and
   (j) informing the applicant whether the loan was approved and of one or more terms of the loan, if approved.

* * * * *